May 19, 1964  F. L. CALHOUN ETAL  3,133,640
BOTTLE INSPECTION SYSTEM
Original Filed June 12, 1958  2 Sheets-Sheet 1
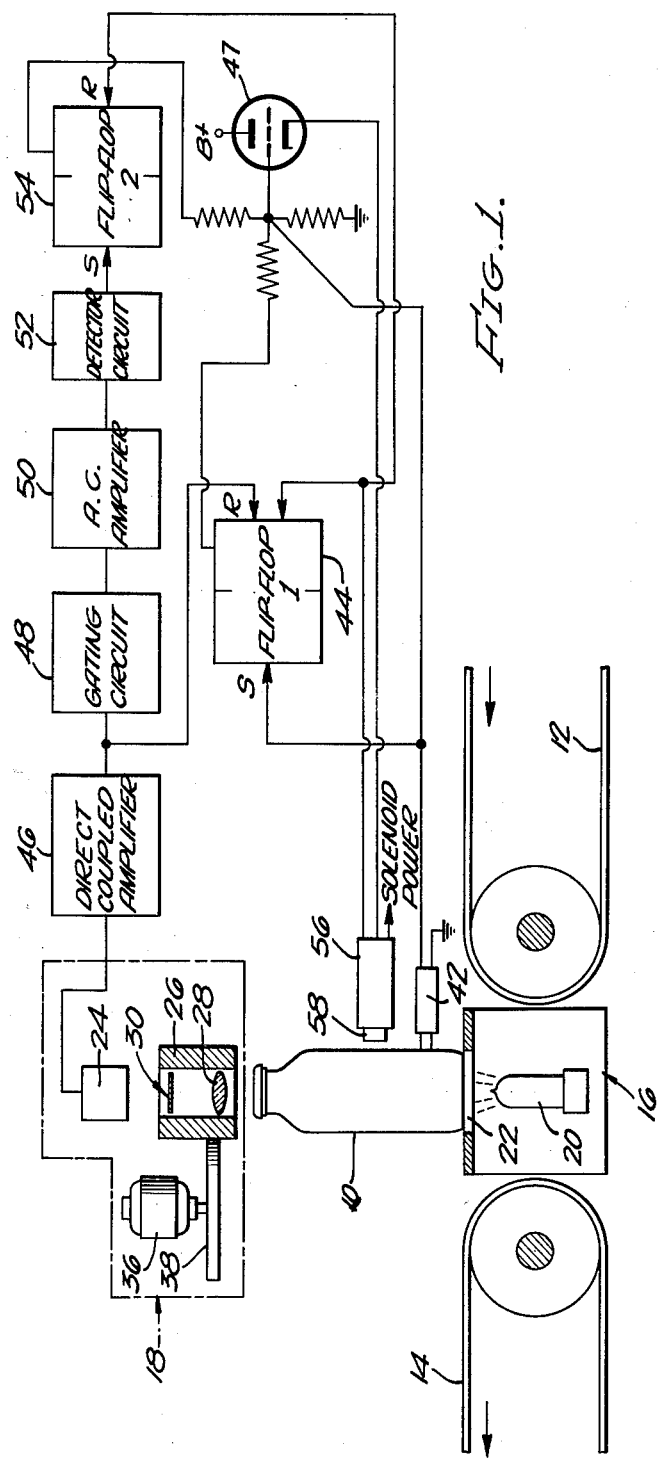
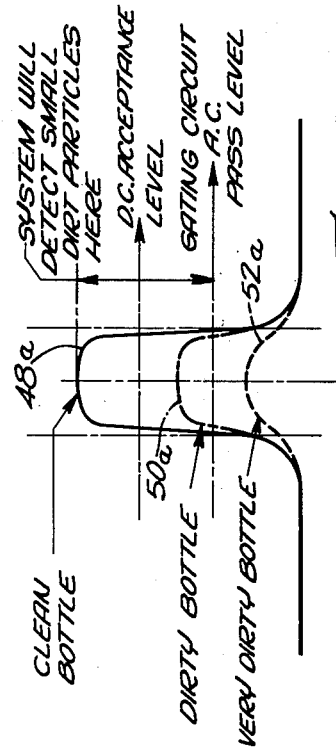
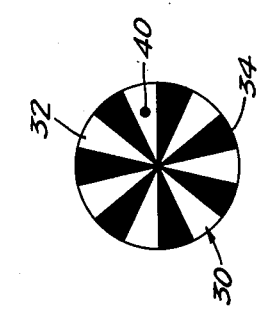
FREDRICK L. CALHOUN
DONALD D. WILLIAMS
JAMES H. WYMAN
INVENTORS
BY
Lyon+Lyon
ATTORNEYS

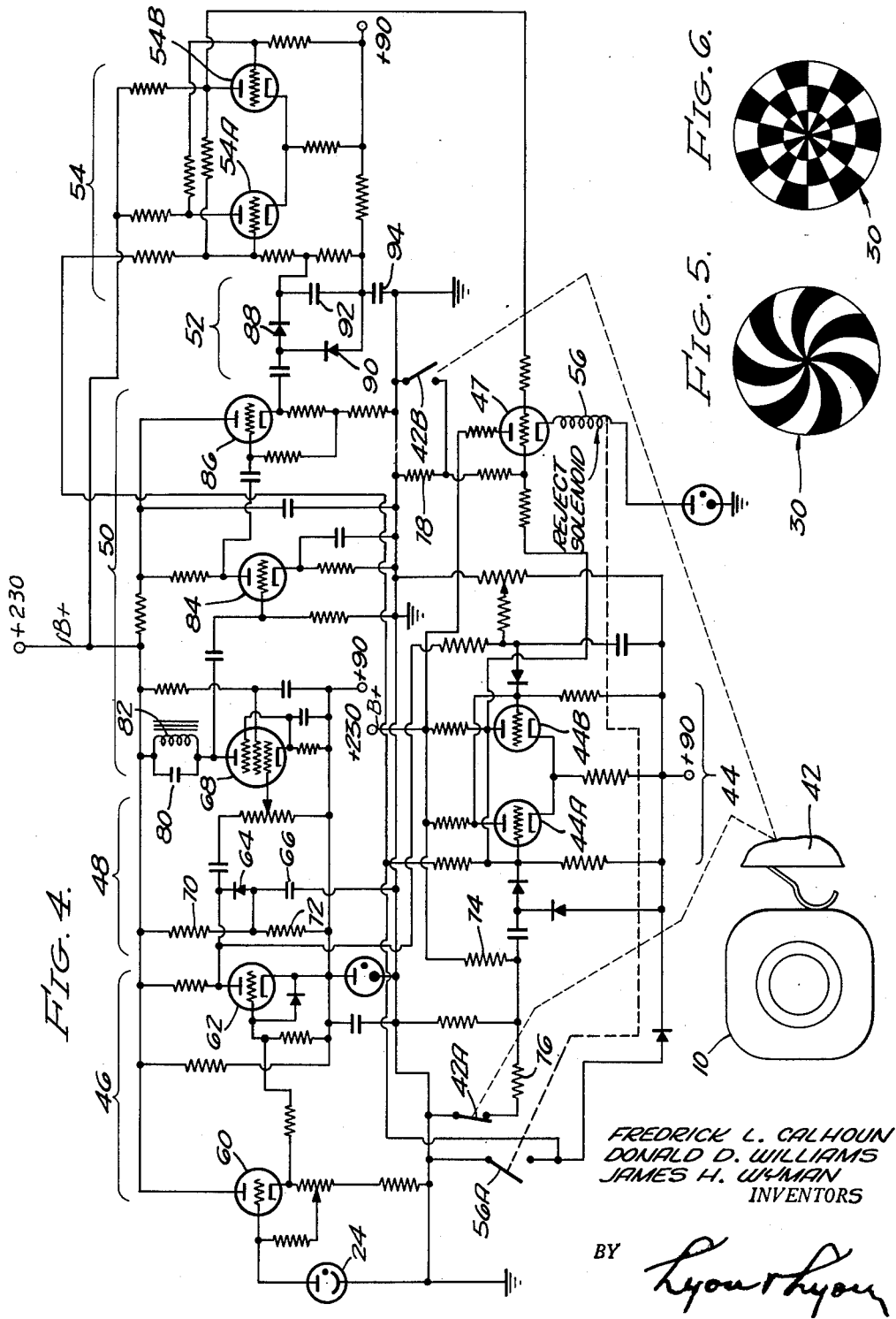

United States Patent Office 3,133,640
Patented May 19, 1964

3,133,640
BOTTLE INSPECTION SYSTEM
Fredrick L. Calhoun, Torrance, Donald D. Williams, Inglewood, and James H. Wyman, Pasadena, Calif., assignors, by mesne assignments, to Geo. J. Meyer Manufacturing Co., Cudahy, Wis., a corporation of Wisconsin
Continuation of application Ser. No. 741,634, June 12, 1958. This application Oct. 5, 1960, Ser. No. 60,753
(Filed under Rule 47(b) and 35 U.S.C. 118)
24 Claims. (Cl. 209—111.5)

This is a continuation of co-pending application Serial No. 741,634, filed June 12, 1958, by Fredrick L. Calhoun, Donald D. Williams and James H. Wyman, for Bottle Inspection System.

This invention relates to apparatus for inspecting bottles for cleanliness and, more particularly, to improvements therein.

The general concept of inspecting bottles by passing a light therethrough and having a photocell, the output of which is indicative of the state of cleanliness of the bottle, is well-known and has been used extensively. Thus far, however, difficulty is still experienced in detecting small particles of dirt in bottles, especially those such as milk bottles, the bottoms of which are of uneven thickness or which may have a seam or lettering of some type.

An object of the present invention is to provide an improved inspection system over those presently available.

Another object of the present invention is the provision of a novel inspection system capable of detecting the presence of smaller dirt particles than has been determinable heretofore.

Still another object of the present invention is to provide a bottle-inspection system which can automatically and rapidly inspect bottles with a greater sensitivity to dirt particles than heretofore possible.

These and other objects of this invention are achieved in an arrangement wherein a bottle-inspecting zone is established, comprising at one side a light source which is preferably diffused and at the other side a photoelectric scanning arrangement including an inspection circuit. The inspection circuit has a bistable state device wherein one state represents a bottle-reject condition and the second state represents a bottle-pass, or accept, condition. When a bottle enters the inspection zone, switch means sets the bistable state device to a reject stable state. In order for a bottle to pass inspection, a signal must be obtained from the output of the photocell scanning device, which is capable of resetting the bistable state device. As a bottle is leaving the inspection zone, the switch means is inactivated, whereby reject apparatus will be activated to reject the bottle if the bistable state device is in its reject stable condition.

The photoelectric scanning means has combined therewith a radial reticle, consisting of a disc having alternate opaque and transparent areas. Means are provided for rotating this reticle in front of the photoelectric scanning means to intercept the light being received through the bottle. As a result, the output of the photoelectric scanning means will be substantially direct current for a clean bottle or substantially alternating current where there are dirt particles in the bottle. Circuit means are provided for establishing the bistable state device in its reject stable state in response to the alternating current and in its pass stable state in response to the direct current.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a logical drawing of an embodiment of the invention;

FIGURE 2 is a drawing of a radical reticle which is employed in the embodiment of the invention;

FIGURE 3 is a wave shape diagram shown to assist in an understanding of this invention;

FIGURE 4 is a circuit diagram of an embodiment of the invention; and

FIGURES 5 and 6 illustrate other reticles which may be employed in accordance with this invention.

Reference is now made to FIGURE 1 of the drawings, which shows a logical arrangement of an embodiment of the invention. The bottles 10 to be inspected are carried to an inspection station. The means for conveying these bottles to the station and from the station is of no significance. By way of example, this is shown here as a first conveyor belt 12, which carries the bottles to the inspection station, and second conveyor belt 14, which removes them from the inspection station. The inspection station is defined by bottle-illuminating means 16 at one side and scanning means 18 at the opposite side. The bottle-illuminating means preferably includes a light bulb 20 positioned adjacent a diffusing glass 22. Any known arrangement for providing a diffused light source may be employed, such as opal glass, Teflon, etc. The scanning means includes a photocell 24. Interposed between the photocell 24 and the bottle 10 is a cylinder 26, which supports a lens 28 for focusing the light rays received from the bottle upon the spoked or radial reticle 30. These light rays then are detected by the photocell. All light which is received by the photocell must preferably be that which has passed through the reticle. It is also preferable that the reticle be centered under the photocell. The reticle should also be centered with respect to the rotating cylinder 26 and lens 28.

As shown in FIGURE 2, the reticle 30 is comprised of a disc having alternate translucent and opaque areas, respectively 32, 34. It is further preferable that there be an odd number of these opaque and translucent areas.

A motor 36 continuously rotates a drive wheel 38, which abuts against the cylinder 26, causing it to rotate also. As a result of employing the rotating reticle between the photoelectric cell and the bottle, smaller particles can be detected than was possible heretofore. Considering FIGURE 2 again, in the absence of any dirt in a bottle, during the inspection interval the output of the photoelectric cell will be a large and substantially direct-current signal, since the total amount of light falling on the photoelectric cell is not changed, despite the rotation of the spoked reticle. Should a particle of dirt 40 be present in the bottle, the opaque areas of the rotating reticle will alternately be over the dirt particle to cover it and then will uncover it. When the particle of dirt is covered, the amount of light falling on the photocell is the same as the amount of light occurring for a clean bottle. However, when the particle of dirt is uncovered, then the amount of light falling on the photocell is diminished. As a result, the output of the photocell will be an alternating current signal, the frequency of which basically is determined by the speed of rotation of the reticle times the number of spokes.

Referring back to FIGURE 1, when the bottle 10 enters the inspection zone, it actuates a microswitch 42. This microswitch 42, when actuated, operates to set a first flip-flop circuit 44 and to hold inoperative a reject circuit, including a reject tube 47. This microswitch is exemplary of any arrangement, such as a photocell for detecting when a bottle enters and leaves the inspection zone. The circuitry for the flip-flop 44 will be shown subsequently herein. At this point, it should be noted that the flip-flop circuit is a bistable state device which can be driven to one or the other of its stable conditions by the application of the inputs to the proper terminals thereof. The condition to which flip-flop 44 is set is one which represents a bottle-reject condition.

The output of the photoelectric cell 24 is applied to a direct-coupled amplifier 46. Referring to FIGURE 3, there is shown superimposed upon one another three characteristic wave shapes which may be obtained at the output of the direct-coupled amplifier in response to three different bottle conditions as a function of bottle position relative to the inspection area. The wave shape 48a is obtained when a clean bottle is present under the scanning device. As may be seen, the top of the wave shape is essentially direct current. The amplitude of this signal is sufficient to reset flip-flop 44 to its pass stable state. A dirty bottle will provide an output such as shown by the wave shape 50a. A very dirty bottle will provide a low-amplitude direct-current output, such as represented by the wave shape 52a. The alternating-current signal output of the reticle is superimposed upon the direct-current signal provided by the average illumination. All signals below the line indicating the acceptance level do not have a sufficient amplitude to reset flip-flop 44. Therefore, the bottle is rejected. If there is presented a bottle having a very small object, or piece of dirt, it is possible to have an alternating-current signal superimposed on a direct-current level which is sufficiently high to exceed the line in FIGURE 3, indicated as the direct-current acceptance level. This can cause flip-flop 44 to be reset to its pass condition. However, the remainder of the circuitry shown in FIGURE 1 can take care of such an eventuality. These alternating-current signals pass through a gating circuit 48 and thereafter are amplified by an alternating-current amplifier 50. The output of the alternating-current amplifier 50 is applied to a detector circuit 52, the output of which sets a flip-flop 54. This flip-flop 54, like flip-flop 44, has a reject stable state to which it is set by the output of detector 52, and a pass stable state.

The outputs of flip-flops 44 and 54, when in their set condition (reject), are applied to the grid of a tube 47, which as previously indicated is the tube which operates the reject mechanism. When bottle 10 is moved sufficiently away from the inspection zone to enable microswitch 42 to be inactivated, then the tube 47 can operate and will become conductive in the event that either flip-flop 44 or 54, or both, is in its reject stable condition. Tube 47 will draw current through a solenoid whereby the mechanical reject device 56 enables a plunger 58 to push the bottle 10 from the conveyor belt into a reject slide. Simultaneously with actuation of the plunger 58, a switch is operated (not shown here) which causes flip-flops 44 and 54 to be reset to their pass stable condition. The switch is operated by incorporating it in the reject mechanism 56.

FIGURE 4 is a circuit diagram of the embodiment of the invention. It includes the photocell 24, the output of which is applied to an amplifier 60 for the photocell output. This amplifier 60 is cathode-follower connected so that the output is derived from its cathode and is applied to a second amplifier tube 62. It will be noted that the tubes 60 and 62 are direct-coupled and constitute direct-coupled amplifier 46. The output of tube 62 is applied to a diode 64, which is connected in series with a condenser 66. The condenser is connected to ground. The output of tube 62 is also connected to the grid of a tube 68. A bias voltage is applied to diode 64 to maintain it normally nonconductive. This bias voltage is derived from a resistance bleeder network, comprising two resistors 70, 72, which are connected between B+ and the cathode of tube 62.

The gating circuit, including the resistance bleeder, the diode 64, and the condenser 66, operates as follows. When a signal is applied to the grid of tube 62, which has an amplitude to cause it to draw a sufficient current so that the cathode portion of diode 64 is reduced below the potential applied to its anode from the resistance divider 70, 72, the diode can conduct. In doing this, it will bypass any alternating current to ground through condenser 66. Therefore, effectively, the gating circuit prevents any alternating current from being applied to the subsequent alternating-current amplifier as long as there is a sufficient high-level direct-current component being applied to the control grid of tube 62. This sufficient high-level direct-current component is established as the minimal value indicative of a clean bottle being inspected by the photocell. This will allow for any variations which are caused by varying thickness and other causes not due to dirt. The gating insures that no alternating-current signal due to extraneous reasons is obtained to provide a false reject operating.

It was previously indicated that when a bottle 10 first entered the inspection zone, a microswitch 42 was actuated. This microswitch has two contacts, normally closed contact 42A and normally open contact 42B. Contact 42A is normally closed; thereby it enables current to flow through a voltage divider connected between B+ and ground. The voltage divider includes resistors 74 and 76. When the contact is opened due to the microswitch 42 being actuated, a positive pulse to the control grid of tube 44A renders it conductive. This causes tube 44B to become nonconductive. Tubes 44A and 44B are the two tubes of the flip-flop circuit 44, and their operation is too well known to need further description here. With conduction in tube 44A, flip-flop circuit 44 is in its reject stable state. A second contact of microswitch 42, designated as contact 42B, serves the function of bypassing a resistor 78, which is one of the two grid-return resistors for the tube 47, which is the reject actuation tube. In this manner, the tube is prevented from responding to any signals applied thereto until such time as the bottle 10 has passed the position of the microswitch 42.

With flip-flop 44 set in its reject stable state, when the bottle 10 reaches the inspection position and if it is clean or has very few dirt particles, a sufficient output will be applied from the plate of tube 62 to the grid of tube 44B, to reset flip-flop 44 with conduction in tube 44B, whereby it represents its pass stable state. If the value of the direct-current component in the received signal is below that for which the gating circuit is biased by means of the resistors 70, 72, then the alternating-current component is applied to the alternating-current amplifier 50, the input to which includes a tube 68. This tube has a tuned circuit in its plate, consisting of a condenser 80 in parallel with inductance 82. The value selected for these components is such as to provide an optimum load and response of the tube to alternating-current signals having a frequency determined by the speed of rotation times the number of divisions of the reticle. In an embodiment of the invention which was built, the reticle had seven blank, or opaque, areas and seven translucent areas. The reticle was rotated at a speed of 157 revolutions per second. It should be further noted that the reason for using an odd number of reticle divisions is because an even number of reticle divisions provides erroneous results when square bottles are inspected. Theoretically, on a symmetrical field no output is obtained with an odd number of spokes and output is obtained with an even number of spokes.

The output of flip-flop 44, consisting of a connection from the plate of tube 44B, is applied to the control grid of tube 47. The tube, however, will not respond until the contacts 42B of microswitch 42 are open. It should be noted that an output which can operate tube 47 is derived from flip-flop 44 only when it is in its reject stable state. Tube 47 will only respond to a positive-going output derived from the plate of tube 44B.

The output of tube 68 is applied to the alternating-current amplifier, which includes tubes 84 and 86, which are coupled in well-known fashion to amplify an alternating-current signal. The output of tube 86 is applied to the detector circuit 52, comprising a voltage doubler circuit, including the two diodes 88, 90, and the two condensers 92, 94. Condenser 92 is charged by the positive-going portion of the alternating-current signal; condenser 94 is charged by the negative-going portion of the alternating-current signal. The charges on these two condensers are added by virtue of the fact that the condensers are connected in series. The output is applied to the control grid of a tube 54A, which renders it conductive, whereby the flip-flop 54, consisting of tubes 54A and 54B, is set in its reject stable condition. A positive-going output is derived from the plate of tube 54B and is applied to the grid of tube 47.

When microswitch 42 is rendered inactive, the contacts 42B open, enabling tube 47 to draw current and energize the solenoid 56, only if there is applied to the tube 47 an output from either flip-flop 54 or flip-flop 44, or from both flip-flops together. In the event neither of these flip-flops is set, the bottle is clean. In the event tube 47 is rendered conductive, the bottle is rejected. At the time of rejection, the solenoid 56 closes the set of contacts 56A. This connects the points designated as B on flip-flops 44 and 54 to ground. This operation applies a negative potential to the control grid of tubes 54A and 44A, causing them to reset to their pass-indicating conditions, if not already reset.

FIGURES 5 and 6 show other pattern variations which may be given to the reticle to obtain operation in accordance with this invention. Instead of a strict radial arrangement of the alternate opaque and translucent areas, we may employ a form of spiral arrangement of these areas as shown in FIGURE 5, or a checkerboard layout as shown in FIGURE 6. The essence of these various reticle patterns is that a reticle be positioned and rotated in front of a photocell so that all the information bearing light or light from the area being inspected passes through the reticle to the photocell and the reticle pattern is such that in the area being inspected any point is scanned by an alternate opaque and translucent area of the reticle.

It should be noted that although the invention is described and shown using a direct-coupled amplifier and flip-flop as well as an alternating-current amplifier and flip-flop, satisfactory operation may also be obtained by eliminating the direct-current amplifier and flip-flop and operating the inspection apparatus by setting a minimum threshold for the alternating-current output from the photocell. Any alternating-current signal about such threshold caused by the presence of dirt will set flip-flop 54, causing it to reject the bottle being inspected. Flip-flop 54 is then reset by the operation of the reject mechanism, as described above.

From the description which has been provided above, it may be seen that a novel and reliable bottle-inspection system has been described, wherein it is possible to automatically detect smaller particles of dirt than heretofore. In view of the use of the diffused light, marking or lettering in the glass of the bottle does not adversely affect the operation of the system in inspecting for dirt particles. It should be noted also that the concept shown structurally in the invention of indicating a bottle as a reject as it enters the inspection zone is a safeguard against any eventualities whereby a dirty bottle may be passed. It is up to the bottle to provide a signal indicative of the fact that it is clean. The presently known systems will pass a bottle unless it proves itself dirty. In the event of temporary power failures, malpositioning of a bottle, or other causes, with such an arrangement, it is possible for the bottle to be passed. The rotating reticle insures that particles of dirt heretofore not detectable when rapid automatic operation is desired are seen and the bottle is rejected. Thus, further cleanliness is assured. In prior-art systems, variations in glass thickness and/or coloring would provide false reject information. With the present invention, which employs a rotating reticle, background variations due to such causes do not give an alternating-current signal, but do give a direct-current signal. Thus, any dirt particles are readily seen, despite background variations.

We claim:

1. In a system for inspecting a bottle for dirt having a bottle inspection zone defined by a means for illuminating one end of a bottle at one side of said zone, photoelectric means to inspect a bottle positioned on the other side of said zone, and means for passing a bottle through said inspection zone, the improvement comprising a first and a second bistable state device each of which has a first stable state representative of a bottle being dirty and a second stable state representative of a bottle being clean, switch means actuated by a bottle entering said zone for setting said first bistable state device to its first stable state, first circuit means responsive to output from said photoelectric means when a clean bottle is in said inspection zone to reset said first bistable state device to its second stable state, second circuit means connected to receive output from said first circuit means and responsive to output from said photoelectric means when a dirty bottle is in said inspection zone to set said second bistable state device to its first stable state, and means responsive to either or both of said bistable state devices being in their first stable states and to inactivation of said switch means by a bottle passing its location to reject said bottle.

2. In a system for inspecting a bottle for dirt having a bottle inspection zone defined by a means for illuminating a bottle at one side of said zone, photoelectric means for inspecting said bottle positioned at the other side of said zone, and means for passing a bottle through said inspection zone, the improvement comprising means combined with said photoelectric means for inspecting said bottles for rendering output therefrom substantially direct current when a clean bottle is in said inspection zone and for rendering output therefrom substantially alternating current when a dirty bottle is in said inspection zone, a first and second bistable state device each of which has a first and second stable state, switch means actuated by a bottle entering said zone for setting said first bistable state device to its first stable state, first circuit means responsive to substantially direct current output above a predetermined level and to alternating current output above a predetermined level from said photoelectric means for resetting said first bistable state device to its second stable state, second circuit means connected to said first circuit means and responsive to alternating current output from said photoelectric means for setting said second bistable state device to its first stable state, and means responsive to either or both of said bistable state devices being in their first stable states and to inactivation of said switch means by a bottle passing its location to reject said bottle.

3. In a system as recited in claim 2 wherein said means combined with said photoelectric means for inspecting for rendering output therefrom substantially direct current when a clean bottle is in said inspection zone and for rendering output therefrom substantially alternating current when a dirty bottle is in said inspection zone includes a disc having alternate transparent and opaque areas, and means for rotatably mounting said disc between the light from said means for illuminating and said photoelectric means to inspect to interrupt the light entering said photoelectric means from a bottle as said disc is rotated.

4. In a system as recited in claim 3 wherein said disc has an odd number of alternate transparent areas.

5. In a system as recited in claim 2 wherein said first and second bistable state devices are flip-flop circuits, said first circuit means includes a direct-coupled amplifier and said second circuit means includes an alternating-current amplifier.

6. In a system for inspecting a bottle for dirt having a bottle inspection zone defined by a means for illuminating a bottle at one side of said zone, photoelectric means for inspecting said bottle positioned at the other side of said zone, and means for passing a bottle through said inspection zone, the improvement comprising a disc having an odd number of alternate transparent and opaque areas, means for rotatably mounting said disc to interrupt light passing from a bottle in said inspection zone to said photoelectric means, means for rotating said disc, a first and second flip-flop circuit each having first and second stable states, switch means actuated by a bottle entering said zone for setting said first flip-flop circuit to its first stable state, a direct coupled amplifier having its input coupled to receive output from said photoelectric means and its output coupled to reset said first flip-flop circuit to its second stable state in response to an output from said photoelectric means exceeding a predetermined level, an alternating-current amplifier, means coupling said direct-coupled amplifier output to said alternating-current amplifier input, means for applying output from said alternating-current amplifier to set said second flip-flop circuit to its first stable state, and means responsive to either or both of said flip-flop circuits being in their first stable states and to inactivation of said switch means by a bottle passing its location to reject said bottle.

7. In a bottle inspection system the combination of means for illuminating with light a bottle having a center and a periphery; photoelectric scanning means for receiving light passing through the bottle and converting it to an electrical signal indicative of the cleanliness of the bottle; said photoelectric scanning means including photocell means having at least one photocell, and optical means for sequentially and cyclically coupling the light from different areas of the bottle to said photocell means where the different areas include the center of the bottle and progressive portions of the periphery of the bottle; said photoelectric scanning means being constructed and disposed to render an alternating current signal output when receiving light from a bottle having small particles of dirt thereon and being constructed and disposed to render a substantially direct current signal output when receiving light from a bottle having no small particles of dirt thereon, and inspection circuit means coupled to said photocell means and constructed to reject a bottle when the output is an alternating signal and further constructed to reject a bottle when the electrical signal output from said photocell means is below a predetermined level, said inspection circuit means being further constructed to pass a bottle when the electrical signal output from said photocell means is both above the predetermined level and a direct current signal but adapted to reject a bottle if the output is an alternating current signal even if the average output is above the predetermined level.

8. In combination for sensing the presence of foreign particles in a container having a bottom wall defined by a center and a periphery, first means disposed relative to the container for directing energy toward the container, second means disposed relative to the container for sensing the energy passing from the container, rotatable means disposed relative to the container and the first and second means for passing the energy in succession from progressive segments of the container where each segment includes the center of the container and a portion of the periphery of the container and where the progressive segments define in succession the bottom of the container and result from the rotation of the rotatable means and where the center of rotation of the rotatable means is disposed within the area defined by the bottom of the container, means operatively coupled to the rotatable means for obtaining a rotation of such rotatable means, and means responsive to the energy received by the second means for producing a signal having first characteristics representing the occurrence of a foreign particle in the container and having second characteristics representing the lack of occurrence of a foreign particle in the container.

9. In combination for sensing the presence of foreign particles in a container having a bottom wall defined by a center and periphery, first means disposed relative to the container for directing energy toward the container, second means disposed relative to the container for sensing the energy passing from the container, rotatable means disposed relative to the container and the first and second means for directing the energy in succession from the first means to the second means along progressive segments of the bottom of the bottle where the progressive segments include the center of the bottom of the bottle and progressive portions of the periphery of the bottle and where the center of rotation of the rotatable means is disposed within the area defined by the bottom of the container, means operatively coupled to the rotatable means for rotating the rotatable means at a particular speed, and, means responsive to the energy passing to the second means from the bottle and the rotatable means for indicating the presence of foreign particles in the container in accordance with the occurrence of alternating characteristics in such energy at progressive instants of time.

10. In combination for sensing the presence of foreign particles in a container having a bottom wall defined by a center and a periphery, first means disposed relative to the container for directing energy toward the container, second means disposed relative to the container for sensing the energy passing from the container and for producing a signal in accordance with the characteristics of the energy sensed at each instant, rotatable means disposed relative to the container and the first and second means for passing the energy in succession from the first means to the second means in progressive segments where each segment extends at least from the center to the periphery of the disc and includes a portion of the periphery of the disc and where the center of rotation of the container is disposed within the area defined by the bottom wall of the container, and means responsive to the production of an alternating signal by the sensing means at a particular frequency dependent upon the speed of rotation of the rotatable means for providing an indication as to the presence of foreign particles in the container.

11. The combination set forth in claim 10 including, a conveyor means for directing the container past the first and second means, and means responsive to the production of the alternating signal representing the occurrence of a foreign particle in the container for directing the container from the conveyor means.

12. In a system for inspecting for dirt a bottle having a bottle inspection zone wherein such system includes means for illuminating at one side of said zone a bottle having a center and a periphery, photoelectric means positioned at the other side of said zone and for inspecting said bottle, means for passing a bottle through said inspection zone, the improvement comprising a disc having alternate transparent and opaque areas extending from the center to the periphery of the disc, means operatively coupled to the disc for disposing the disc relative to the illuminating means and the bottle to provide for the passage of light from the illuminating means through complete transparent areas of the discs to obtain an inspection of the bottle in an area extending at least from the center of the bottle to a portion of the periphery of the bottle, means operatively coupled to the disc for rotating the disc to provide for the passage of light from the illuminating means through successive ones of the complete transparent areas for an inspection of successive areas extending from at least the center of the bottle to successive portions of the periphery of the bottle, means operatively coupled to the disc for rotating said disc on a center within the periphery of the bottle to interrupt the light passing from the bottle to said photoelectric means and to obtain an inspection of successive areas extending from at least the center of the bottle to successive portions of the periphery of the bottle, and means responsive to the light passing from the illuminating means to the photoelectric means during the rotation of the disc to provide an indication as to the presence of dirt in the bottle.

13. In a bottle inspection system of the type wherein a diffused light source illuminates a bottle having a center and a periphery and a photoelectric scan is employed to provide an output in accordance with the cleanliness of the bottle, an improvement in said system comprising a rotatable cylinder having a longitudinal axis, means operatively coupled to said cylinder for mounting said cylinder for rotation about its longitudinal axis before said photoelectric scan with its longitudinal axis intersecting said photoelectric scan and with the longitudinal axis disposed within the periphery of the bottle, a reticle disc mounted near one end of said cylinder closest to said photoelectric scan with its center coincident with said cylinder longitudinal axis, and a lens mounted near the other end of said cylinder for focusing light from the area being inspected upon said reticle disc, said reticle disc having opaque and translucent areas including the center and a portion of the periphery of the disc and positioned in a pattern adapted to scan any point in an area being inspected alternately by an opaque and translucent area, the disc being disposed relative to the bottle to obtain a scan by the translucent areas at each instant of a portion of the bottle including the center of the bottle and a portion of the periphery of the bottle.

14. A bottle inspection system for a bottle having a center and a periphery, including, means disposed relative to the bottle for illuminating a bottle with light, scanning means including an annular member having alternate opaque and translucent areas along the entire annular length of the member with each opaque and translucent area extending between at least the center and the periphery of the bottle to test on a segmental basis between at least the center and the periphery of the bottle at each instant of time, the annular member being disposed with its center within the periphery of the bottle, means operatively coupled to the annular member for inducing relative motion between said member and the light and for inducing such relative motion on the center of the annular member as an axis, said scanning means being disposed relative to said bottle to pass light of substantially constant intensity when a clean bottle is being illuminated and to pass light of variable intensity when a dirty bottle is being illuminated, photoelectric means disposed relative to said scanning means to receive light from said scanning means and to render a substantially constant signal output when receiving light of constant intensity and a variable signal output when receiving light of variable intensity, and inspection circuit means operatively coupled to said photoelectric means for receiving the output from said photoelectric means, said inspection circuit means being constructed to pass a bottle when a substantially constant signal is received and to reject a bottle when a variable signal is received from said photoelectric means.

15. In an inspection system for detecting particles in a homogeneous medium in a container having a center and a periphery, means for providing radiant energy through a field of the homogeneous medium so as to be modulated by the radiant energy transmission characteristics of both the medium and any particles in the medium, and means for cyclically and sequentially scanning different extended areas of the field of the medium on a center within the periphery of the bottle, where the extended area scanned at any instant is substantially greater than the size of particles in the medium and is defined by a segment extending at least from the center to the periphery of the container, said scanning means including means for converting the modulated radiation energy from the cyclically and sequentially scanned areas of the field of the medium to an electrical signal having alternating characteristics dependent upon the occurrence of a particle in the medium.

16. In an inspection system for detecting the presence of a particle in a container having a center and a periphery, means disposed relative to the container for illuminating the container with light, photocell responsive means for converting light to an electrical signal, the photocell responsive means being rotatable on a center within the periphery of the container for sequentially and cyclically coupling the light from different areas of the container to said responsive means where the area from which light is coupled to the responsive means at any instant is substantially larger than the particle to be detected and includes the center of the container and a portion of the periphery of the container, and circuit means coupled to said photocell respoonsive means for detecting at said responsive means an alternating signal having characteristics indicative of the presence of a particle in the container.

17. In an inspection system for detecting particles in a homogeneous medium in a container having a center and a periphery, means rotatable on a center within the periphery of the container for providing at successive instants radiant energy through the center of the container and progressive portions of the periphery of the container to be modulated by the radiant energy transmission characteristics of the medium and of any particles in the medium, and means responsive to the modulated radiant energy from the medium for converting the modulated radiant energy to an electrical signal having an alternating component for each particle in the medium with each component having a magnitude related to the size of the associated particle.

18. In an inspection system for detecting the presence of a particle in a container having a center and a periphery, means for illuminating a field of the container for scanning, light responsive means including a light coupler rotatable on a center within the periphery of the container for sequentially scanning different areas of the illuminated field where the areas are substantially greater than the size of the particles to be detected and include at each instant the center and a portion of the periphery of the container, said light responsive means further including at least one photocell disposed relative to the container to receive the light from the coupler and to produce an electrical signal in accordance with the characteristics of such light, threshold responsive means electrically coupled to said photocell for detecting particular alternating components in the electrical signal produced by said photocell, and circuit means coupled to said photocell for monitoring the level of said electrical signal from said photocell and for inhibiting the operation of said threshold responsive means for particular levels of the signal produced by said photocell.

19. In an inspection system for a container having a center and a periphery, a source of radiant energy for providing radiant energy to said container so as to be modified by the transmission characteristics of the container and the contents of the container, radiant energy responsive means for receiving radiant energy and for providing an electrical signal in accordance therewith, and modifying means in the path of radiant energy from the container to the responsive means and rotatable on a center within the periphery of the container for receiving the radiant energy from the container and for providing to said responsive means, at successive instants in accordance with the rotation of the rotatable means, radiant energy in progressive portions of the container including the center and progressive portions of the periphery and for providing such radiant energy at an energy level related to the average transmission characteristics of the container and the contents of the container and having an alternating component at a predetermined frequency and at a magnitude indicative of any discontinuity of the transmission characteristics of the contents of the container due to the presence of a particle of dirt in the contents of the container.

20. In an inspection system for detecting small foreign particles in a homogeneous medium in a container having a center and a periphery, rotatable means having a center of rotation within the periphery of the container for providing radiant energy through progressive segments of the container in succession where the progressive segments include the center and progressive portions of the periphery of the container to obtain a modulation by the radiant energy transmission characteristics of the medium and of any particles in the medium, and converting means responsive to the modulated radiant energy from the medium for providing a direct current electrical signal indicative of the average transmission characteristics of the medium and of any particles in the medium and also an alternating current electrical signal for each particle in the medium at a particular frequency and at a magnitude related to the size of the particle.

21. In a bottle inspection system for detecting small particles of dirt of a type wherein a diffused light source illuminates a bottle having a center and a periphery and a photoelectric scan is employed to provide an output in accordance with the cleanliness of the bottle, an improvement in said system comprising a rotatable optical member having a center of rotation at a position within the periphery of the bottle, and means operatively coupled to said optical member for positioning said optical member for rotation in front of said photoelectric scan to intercept all information bearing light from a bottle being inspected to said photoelectric scan, said rotatable optical member including means for sequentially coupling information bearing light from different areas of the bottle to said photoelectric scan where the area from which light is provided at any instant is substantially larger than the cross-sectional area of any particle of dirt to be detected and includes the center of the bottle and a portion of the periphery of the bottle.

22. In a bottle inspection system the combination of:

means for illuminating with light a bottle having a center and a periphery;

photoelectric scanning means for receiving light passing through the bottle and converting it to an electrical signal indicative of the cleanliness of the bottle;

said photoelectric scanning means including photocell means having at least one photocell, and optical means for sequentially and cyclically coupling the light from different areas of the bottle to said photocell means;

said photoelectric scanning means being constructed and disposed to render an alternating current signal output when receiving light from a bottle having small particles of dirt thereon and being constructed and disposed to render a substantial direct current signal output when receiving light from a bottle and having no small particles of dirt thereon; and inspection circuit means coupled to said photocell means and constructed to reject a bottle when the output is an alternating signal and further constructed to reject a bottle when the electrical signal output from said photocell means is below a predetermined level;

said inspection circuit means being further constructed to pass a bottle when the electrical signal output from said photocell means is both above the predetermined level and a direct current signal but adapted to reject a bottle if the output is an alternating current signal even if the average output is above the predetermined level.

23. In a bottle inspection system the combination of:

means for directing a steady light through a bottle;

photoelectric scanning means for receiving light passing through the bottle and converting it to an electrical signal indicative of the cleanliness of the bottle;

said photoelectric scanning means including photocell means having at least one photocell, and optical means for sequentially and cyclically coupling the light from different areas of the bottle to said photocell means;

said photoelectric scanning means being constructed and disposed to render an alternating current signal output when receiving light from a bottle having small particles of dirt thereon and being constructed and disposed to render a substantially direct current signal output when receiving light from a bottle and having no small particles of dirt thereon; and inspection circuit means coupled to said photocell means;

said inspection circuit means including amplifier means tuned to a specific frequency range, said range covering the frequency of the alternating current signal output rendered by said photocell means when re-receiving light from a bottle having small particles of dirt therein;

said inspection circuit means being further constructed to reject a bottle if the photocell output is an alternating current signal having a frequency within said specific tuned frequency range.

24. In a bottle inspection system of the type where a diffused light source illuminates a bottle having a center and a periphery and where a photoelectric means is employed to provide an output in accordance with the cleanliness of the bottle;

an improvement in said system comprising a disc;

means for rotatably supporting said disc on a center located within the periphery of the bottle being inspected, said disc having alternate radial opaque and translucent areas each including the center of the disc and a portion of the periphery, said disc being positioned relative to the bottle to pass to the photoelectric means the light passing at each instant through at least one complete translucent area and through a portion of the bottle between at least the center and a portion of the periphery; and means operatively coupled to the disc for rotating said disc to pass its alternate opaque and translucent areas before said photoelectric means.

References Cited in the file of this patent

UNITED STATES PATENTS

| | | | |
|---|---|---|---|
| 2,016,036 | Fitz-Gerald | Oct. 1, | 1935 |
| 2,395,482 | Harley | Feb. 26, | 1946 |
| 2,415,174 | Harley | Feb. 4, | 1947 |
| 2,636,602 | Stoate | Apr. 28, | 1953 |
| 2,798,605 | Richards | July 9, | 1957 |
| 2,820,906 | Miller | Jan. 29, | 1958 |
| 2,931,912 | Macleish | Apr. 5, | 1960 |
| 2,947,877 | Stoate | Aug. 2, | 1960 |
| 2,956,170 | Sibley | Oct. 11, | 1960 |
| 2,967,247 | Turck | Jan. 3, | 1961 |